Feb. 17, 1970  L. KATZMAN ET AL  3,495,583
VAPORIZER ATTACHMENT

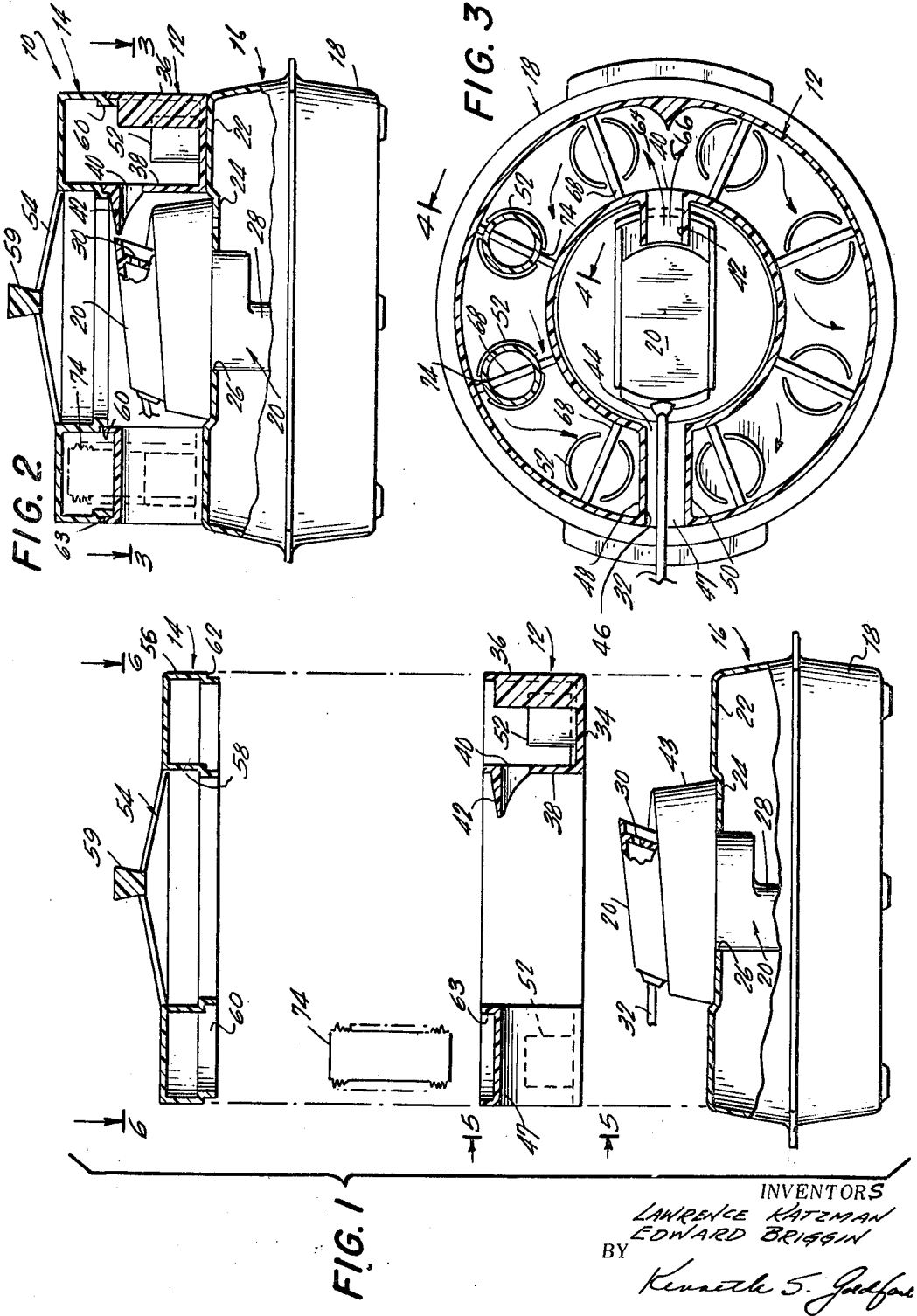

Filed June 6, 1968  2 Sheets-Sheet 2

INVENTORS
LAWRENCE KATZMAN
EDWARD BRIGGIN
BY
Kenneth S. Goldfarb
ATTORNEY

United States Patent Office 3,495,583
Patented Feb. 17, 1970

3,495,583
VAPORIZER ATTACHMENT
Lawrence Katzman, New York, and Edward Briggin, Brooklyn, N.Y., assignors to Kaz Manufacturing Co., Inc., New York, N.Y., a corporation of New York
Filed June 6, 1968, Ser. No. 735,046
Int. Cl. A47j 27/122; A47g 23/04
U.S. Cl. 126—381      7 Claims

ABSTRACT OF THE DISCLOSURE

This invention relates to a heating device which is adaptable to the heating of objects having various contours in multiple units simultaneously. The apparatus capable of performing this function utilizes, in conjunction with a steam dispenser, an attachment including vertically rising ribs for gripping the object to be heated and support means therefor.

---

This invention relates to a heating device which is easily adapted to heating a variety of objects in multiple units simultaneously. More particularly, the steam heating device of the present invention is readily adaptable to the heating of baby bottles and women's hair rollers.

Various types of baby bottle warmers have been developed in the past which for the most part employ means for heating water in which the baby bottle is subsequently immersed. It generally requires a considerable period of time to sufficiently heat the water to the extent where a baby bottle will subsequently be heated satisfactorily. Further, when the baby bottle is immersed directly in the heated water, very often the temperature differential will cause cracking of the baby bottle. In addition, the open surface of boiling water is a considerable hazard.

Heretofore, prior attempts to eliminate these difficulties by utilizing steam vaporizers and adapters thereupon have met with some success although the improved devices utilizing attachments requiring costly conversion of the machinery used to manufacture them, are not readily adaptable, to the heating of other objects, and do not heat more than a single baby bottle at a time.

It is therefore the primary object of this invention to provide means for use in combination with a steam emitting apparatus to heat a plurality of objects simultaneously, which means are readily adaptable to a variety of contours and sizes in the object to be heated.

It is a further object of this invention to provide an attachment being readily adaptable to fiit the contours of other objects.

It is also an object of the present invention to provide means for use in combination with a steam emitting apparatus to safely and rapidly heat a plurality of objects at the same time.

Prior workers in the field have found that rapid hair sets may be achieved by utilizing preheated hair rollers. However, the various electrical devices developed to heat the hair setting rollers are generally unsafe in that the user may be burned or the hair scorched by these dry heat type devices capable of being heated to extreme temperatures especially when operative under faulty conditions. Since steam is used in the present invention under only atmospheric conditions, the temperature is strictly limited by physical conditions of heating.

Therefore, a further object of the present invention is to provide a novel attachment for a steam emitting apparatus for the safe, convenient heating of women's hair rollers.

Still further objects and features of this invention reside in the provision of a steam heating device that is capable of being utilized for a variety of heating purposes, which is simple in construction and manufacture, capable of being made out of materials which are easily cleaned, durable, and which is substantially fool-proof and extremely safe to use.

These, together with the various ancillary objects and features of the present invention, which will become apparent as the following description proceeds, are attained by this attachment for steam heating devices, which is illustrated in the accompanying drawing, by way of example only, wherein:

FIG. 1 is an exploded elevational view of one embodiment of the invention with parts thereof being broken away and showing other parts in section for clarity;

FIG. 2 is a view similar to FIG. 1, but showing the invention in an assembled position;

FIG. 3 is a horizontal sectional view of the device without the cover portion taken along the plane of line 3—3 in FIG. 2;

Figure 4:
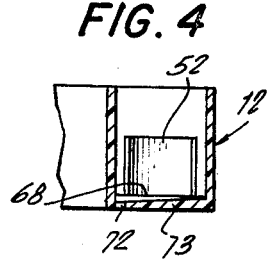
FIG. 4 is a fragmentary vertical sectional view of fluid container of this invention taken along the plane of line 4—4 in FIG. 3.

With continuing reference to the accompanying drawings, wherein like reference numerals designate similar parts throughout the various views, reference numeral 10 is used to generally designate the attachment comprising the fluid container 12 and the cover portion 14, which when utilized in conjunction with a steam dispenser, generally indicated at 16, comprises the combination of the present invention. The steam dispenser 16 includes two main parts, a container 18 and a steam emitting head 20. The container 18 is of any suitable shape and is provided with an upper wall 22 having a depressed portion 24 surrounding the periphery of a primal central aperture 26. The steam emitting head 20 includes a heating element assembly 28 which extends into the container 18 for heating the water in the container 18 through use of electrodes, not shown, within the heating element assembly 28 so that steam is directed upwardly and outwardly of the spout 30 of the steam emitting head 20. The electrodes may be generally of the type disclosed in the patent to Lawrence Katzman and Edward Briggin, No. 3,319,046, issued May 9, 1967. An electric cord set 32 is utilized for connecting the steam emitting head to a suitable source of electric power.

The depressed portion 24 of the upper wall 22 may be slightly tapered downwardly and inwardly so that any liquid formed from condensation of steam which gathers thereon will be directed back through the primary aperture 26 and into the container 14.

The fluid container 12 includes a bottom wall 34, an outer wall 36 and an inner wall 38 concentric with its outer wall which defines a cylindrical opening for receiving the portion 43 of steam emitting head 20 which protrudes above the upper wall 22 of container 18 when the fluid container 12 is positioned thereon.

Figure 5:
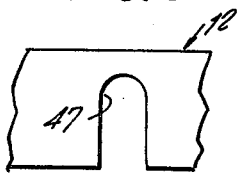
FIG. 5 is a fragmentary vertical view of the exterior of the fluid container taken along the plane of line 5—5 in FIG. 1.

The inner wall 38 of fluid container 12 is provided with a steam outlet 40 and a flange of material 42 integral with inner wall 38, which partially surrounds steam outlet 40 and extends radially inward of inner wall 38, slightly inclined in a downward direction so as to permit the steam emanating from steam dispenser 16 to flow into fluid container 12 while at the same time allowing for condensate to flow back into the cavity defined by inner wall 38. The inner wall 38 and outer wall 36 have openings 44 and 46, respectively which define a passage 47, shown in FIG. 5, for electric cord set 32, the electric cord set 32 being protected from moisture by walls 48 and 50. The bottom wall 34 of fluid container 12 is provided with a plurality of pairs of vertically extending flanges of material or ribs 52 disposed at equal intervals thereon, the ribs being described more fully hereinafter.

Figure 6:
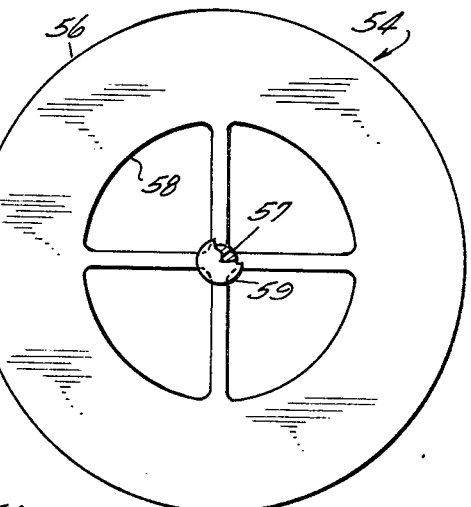
FIG. 6 is a top plan view of the cover portion of the device looking along the plane of line 6—6 in FIG. 1, parts being broken away to show other parts in detail.

The cover portion 14 has a top 54, an outer wall 56, an inner wall 58 concentric with the outer wall 56, and an open bottom end. The top, as shown in FIG. 6, includes a central button 57 covered with an insulating material 59 to permit easy grasping of the cover. Outer wall 56 is provided in its lower portion with a radially inwardly and downwardly extending lip 60 of lesser diameter than its upper portion, the lip 60 defining a shoulder 62 for facilitating the seating of cover porton 14 upon the bead of material 63 disposed at the periphery of the inside of the upper part of fluid container 12. The cover portion 14, thus superposed upon fluid container 12, forms an elongated cylindrical fluid chamber in which the steam dispensed by steam emitting head 20 will flow in the opposite directions indicated by arrows 64 and 66.

The attachment 10, including fluid container 12 and cover portion 14, is capable of being used for heating numerous objects at the same time. The vertically rising rib pairs 52 are substantially semicircular in shape, each pair partially surrounding the object to be heated. Situated on the bottom of fluid container 12, in the area enclosed by each rib pair, is an upwardly extending flange 68 for supporting the object 10 to be heated in a manner which permits the steam to pass beneath the object. Disposed at the bottom of the fluid container is a plurality of apertures 72, which communicate with the container 18, illustrated by FIG. 4, for collecting condensed steam. Preferably, the bottom wall 34 of fluid container 12 is slightly sloping downwardly and inwardly from outer wall 36 to inner wall 38, defined by the inclined bottom wall 73 of FIG. 4, for the purpose of permitting apertures 72 to perform their function more efficiently.

In the embodiment of the invention, illustrated by FIG. 2, the object to be heated is a woman's hair roller, designated by reference numeral 74.

Figure 7:
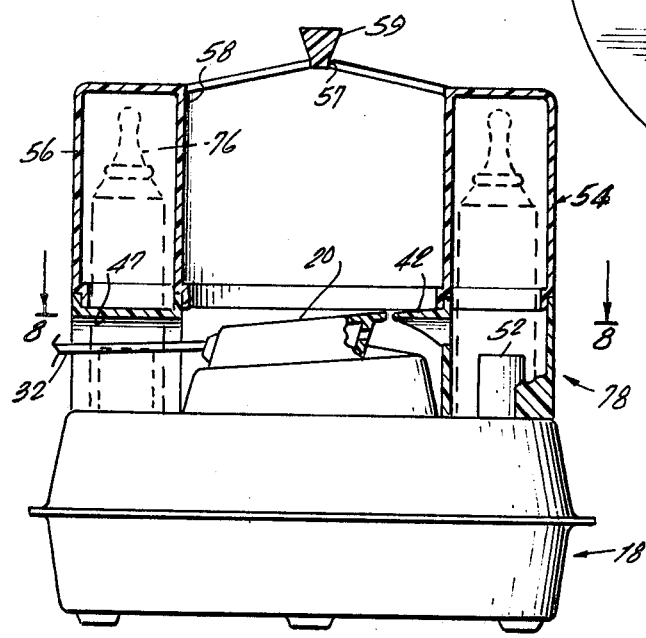
FIG. 7 is an elevational view of a second embodiment of the steam heating device of the present invention with parts being broken away to show other parts in section for clarity; and, FIG. 8 is a partial fragmentary horizontal sectional view of the embodiment shown in FIG. 7 taken along the plane of line 8—8 in FIG. 7.
Figure 8:
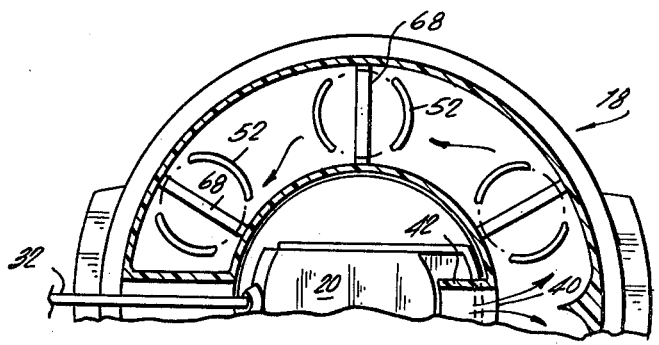

In a second embodiment, depicted by FIG. 7, the object is a baby bottle 76. As can be easily seen the relative height of the baby bottle requires that the cover portion 76 be of a greater length than that of the fluid container 78.

It is also contemplated by this invention to vary the shape of the vertically extending ribs to permit the firm gripping of objects having unusual contours.

A latitude of modification, substitution and change is intended in the foregoing disclosure, and in some instances some features of the present invention may be employed without a corresponding use of other features. Accordingly, it is appropriate that the appended claims be construed broadly and in a manner consistent with the spirit and scope of the invention herein.

We claim:
1. A heating device comprising a fluid container having an upper wall and a steam emitting head for dispensing steam mounted on said container, said steam emitting head being provided with a steam outlet, a cylindrical container disposed on said upper wall of said fluid container having a substantially horizontal bottom wall, an outer wall, an inner wall concentric with said outer wall and an open upper end receiving said steam emitting head, being disposed within the periphery thereof said innerwall, and a cover portion having an outer wall, an inner wall and an open lower end, said open lower end of said cover portion being superposed upon said open upper end of said cylindrical container, thereby forming an elongated cylindrical fluid chamber, said bottom wall of said cylindrical container having support means rising upwardly therefrom for supporting at least one article to be heated.

2. A heating device according to claim 1, wherein said support means include a plurality of upwardly directed rib pairs disposed at equal intervals thereon for at least partially surrounding the object to be heated, each of said upwardly directed rib pairs enclosing means for allowing steam emitted from said steam emitting head to pass beneath the object to be heated.

3. A heating device according to claim 2, wherein said inner wall of said cylindrical container includes means disposed in the inner wall of said cylindrical container, downwardly directed and extending radially inward of said inner wall, said means partially surrounding said steam outlet for directing the steam dispensed from said steam emitting head into said elongated chamber formed by said cylindrical container and said cover portion.

4. A heating device according to claim 3, wherein each of said rib pairs encloses at least one aperture which communicates with said fluid container for permitting condensate to flow into said container.

5. A heating device according to claim 3, wherein said support means is an upwardly extending flange.

6. A heating device according to claim 5, wherein each of said upwardly directed rib pairs is substantially semicircular so as to conform to the contours of and partially surround a cylindrically shaped hair roller.

7. A heating device according to claim 1, wherein the outer wall and inner wall of said cover portion are of a greater length than the length of the corresponding outer wall and inner wall of said fluid container for ease in positioning of baby bottles within said elongated cylindrical fluid chamber.

References Cited

UNITED STATES PATENTS

| | | | |
|---|---|---|---|
| 547,590 | 10/1895 | Smith | 126—369.3 |
| 2,679,244 | 5/1954 | Fucci | 126—261 |
| 3,351,737 | 11/1967 | Katzman et al. | 219—271 |

KENNETH W. SPRAGUE, Primary Examiner

U.S. Cl. X.R.
126—261, 369.2